United States Patent [19]

Gonzalez

[11] 4,061,130

[45] Dec. 6, 1977

[54] SOLAR ENERGY DEVICE

[76] Inventor: Eduardo E. Gonzalez, 2284 NE. First St., Boca Raton, Fla. 33432

[21] Appl. No.: 572,122

[22] Filed: Apr. 28, 1975

[51] Int. Cl.² .............................................. F24J 3/02
[52] U.S. Cl. .................................. 126/271; 250/203 R
[58] Field of Search ............... 126/270, 271; 237/1 A; 250/203 R

[56] References Cited

U.S. PATENT DOCUMENTS

| 1,989,999 | 2/1935 | Niederle | 126/271 |
| 2,712,772 | 7/1955 | Trombe | 126/270 X |
| 2,872,915 | 2/1959 | Bowen | 126/271 |
| 2,902,028 | 9/1959 | Manly | 126/271 |
| 2,920,710 | 1/1960 | Howard | 126/270 |
| 3,713,727 | 1/1973 | Markosian, et al. | 126/271 |
| 3,905,352 | 9/1975 | Jahn | 126/270 |

Primary Examiner—Kenneth W. Sprague

[57] ABSTRACT

A solar energy device for converting solar energy to a usable form of energy which includes a solar energy collector arranged adjacent a solar energy collector surface in sun energy transferring relation and tracking means to orient the face in perpendicular relationship to the sun rays.

11 Claims, 8 Drawing Figures

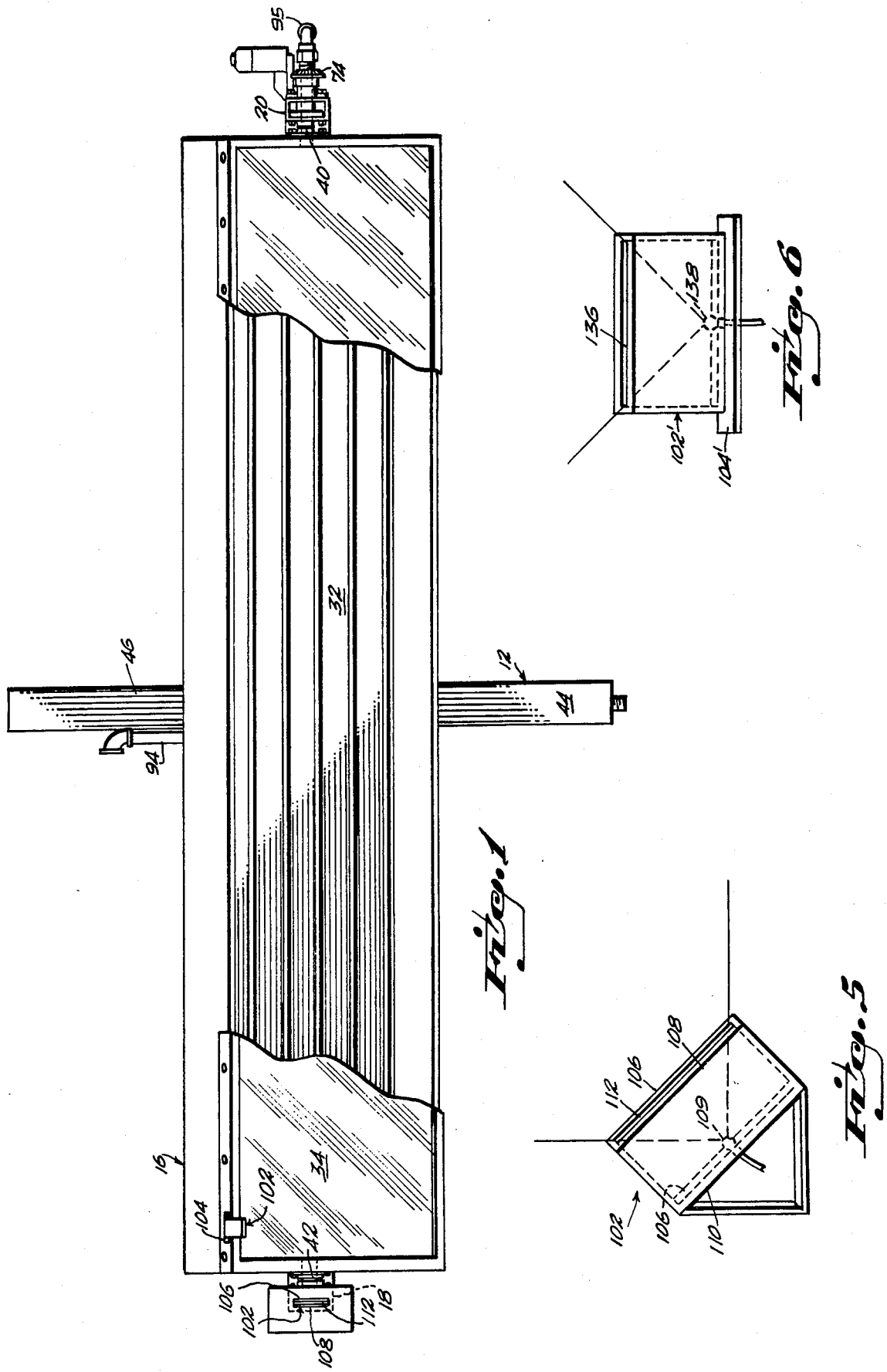

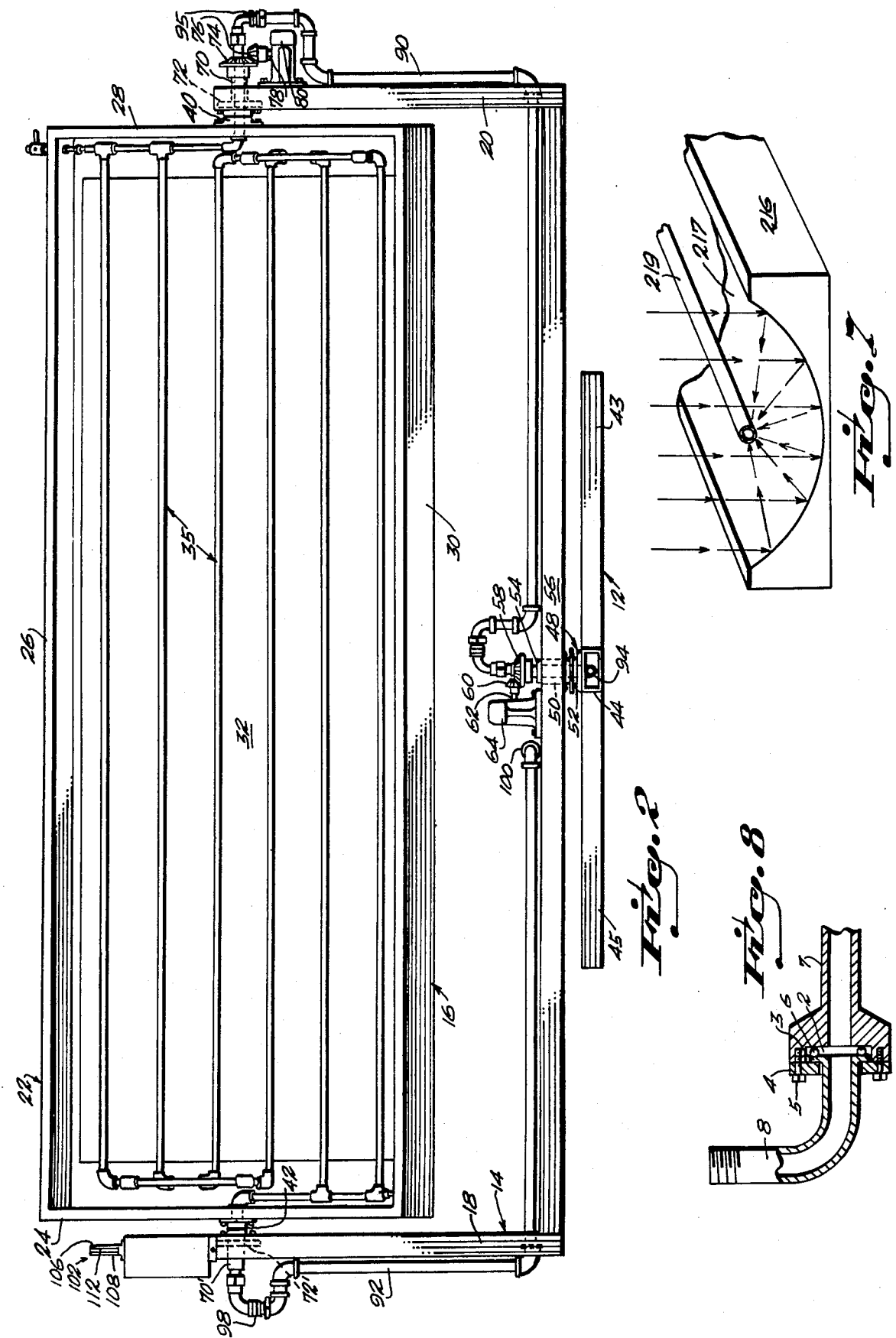

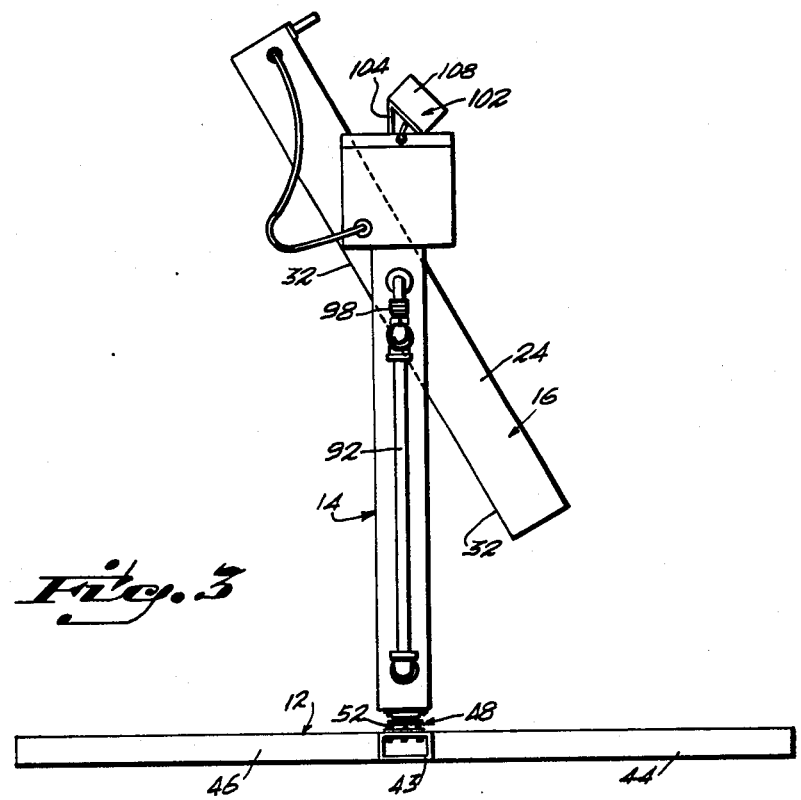
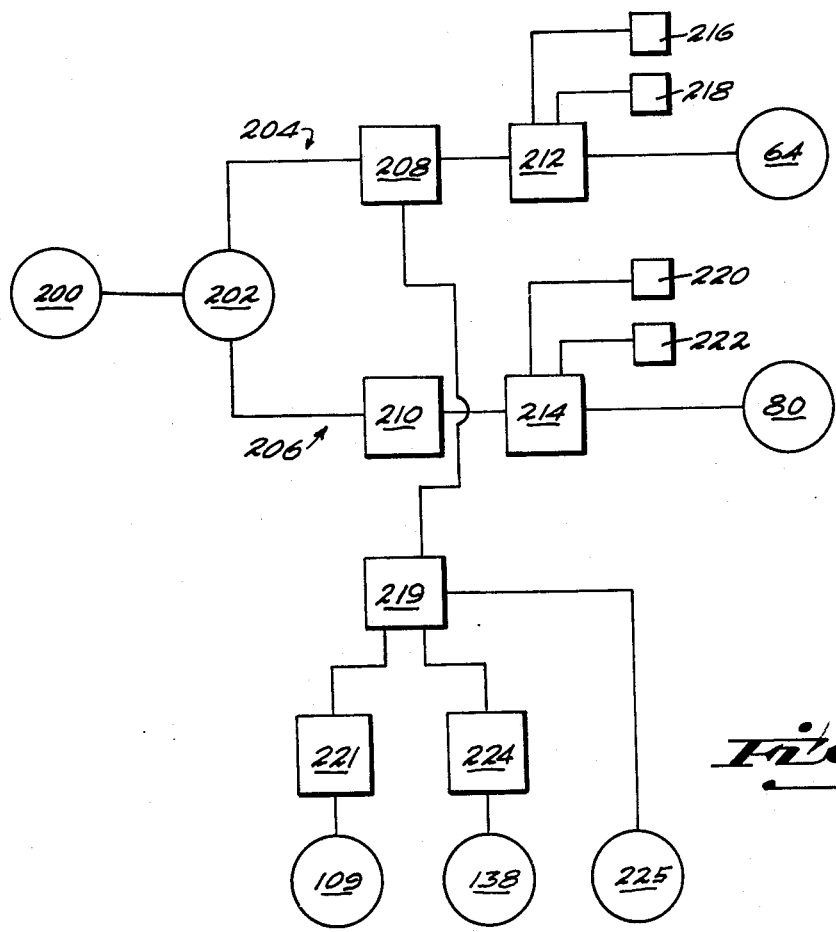

SOLAR ENERGY DEVICE

FIELD OF THE INVENTION

This invention relates to a device to convert solar energy to useful energy.

BACKGROUND OF THE INVENTION

As is perhaps well known solar energy can be collected and converted into other types of energy, such as heat energy or electrical energy. This invention is of a solar energy device which includes a tracking means to track the sun and maintain a face on which sun rays impinge in generally perpendicular relation to the sun rays, that is, in such an attitude as to be facing the sun.

Generally, the solar energy unit includes an automatic tracking system which includes a motorized base which provides two movements, one to provide azimuth orientation and another to provide elevation orientation. By combining these two movements, a face is caused to face the sun and, hence, to maximize the amount of solar energy which is converted by the unit.

Generally speaking the tracking system includes an automatic tracking of the unit toward the sun to daylight hours, a search for the sun after any interruption of sun rays due to cloud cover, and a switch-off system for the entire system at twilight as well as under overcast conditions, leaving the system in the last position where the solar radiation was sensed and means limiting the angles of rotation of azimugh and elevation.

The energy that can be absorbed from the sun will be at a maximum when the absorbing surface is facing directly toward the solar rays at any given time. The tracking system includes the followig elements: relays which are operated by photoelectric cells and which are operatively connected to an azimuth motor and an elevation motor which causes the unit to rotate through azimuth angles to find the sun and through elevation angles to find the sun elevation and the unit also includes reversing relays in conjunction with limit switches to control and limit the angle of rotation through which the unit may be rotated.

Generally the operation of the various elements of the system, which depend upon the intensity of the solar radiation and the position of the solar unit with respect to the sun, are provided with sensing means to sense and to work in conjunction with the tracking means to follow the sun. In the morning, when the master sensor included in the unit senses sufficient solar radiation density, it activates the automatic tracking system which is controlled by an azimuth angle sensor and an elevation angle sensor and these two latter sensors start their corresponding motors which cause rotation of the unit about a vertical and a horizontal axis to search for that position of a face which is intended to face the sun and which does face the sun when the correct azimuth and elevation angles have been achieved. In the preferred embodiment the azimuth angle adjustment takes place first and, thereafter, after this condition is obtained, the elevation angle is obtained.

OBJECTS OF THE INVENTION

It is, accordingly, an object of this invention to provide a solar energy unit which includes a sun tracking system and means to sense the position of the sun with respect to azimuth and elevation angles to orient the unit in a most favorable attitude for converting solar energy to other forms of energy.

In accordance with these and other objects which will become apparent hereinafter the instant invention will now be described with reference to the accompanying drawings in which:

DESCRIPTION OF THE DRAWINGS

FIG. 1 is a plan view of the instant invention;

FIG. 2 is a side elevation view of the unit of FIG. 1;

FIG. 3 is a left side elevation view of the device shown in FIGS. 1 and 2;

FIG. 4 is a control block diagram;

FIGS. 5 and 6 are perspective views of the sun sensing devices described more fully hereinafter;

FIG. 7 is an alternative view of the main face of the unit to be oriented to face the sun which is in the form of a parabolic mirrored surface with a pipe, through which material flows to be heated, arranged in the focus zone of the parabolic mirrored surface; and FIG. 8 is a view in cross section illustrating a universal connection of the pipes described hereinafter.

DESCRIPTION OF A PREFERRED EMBODIMENT

Referring to the drawings wherein like reference characters designate like or corresponding parts throughout the several views, and referring, first, to FIG. 3, there is provided a base 12 with an upstanding rotatable yoke 14, the upstanding arms 18 and 20 of which are spanned by a tiltable member 16 which has a main surface to be affected by sun rays and which is arranged in heat exchanging relation to a sun energy collector which may be in the form of a network of pipe through which water flows. The yoke is mounted to the base for rotation through azimuth angles while the elevation angle or tilt of the member 16, which is pivotally connected to the yoke, adapts it to alter or tilt the elevation angle of the member 16, as will be explained more fully hereinafter.

Generally speaking, the member 16 may be in the form of a frame 22 with interconnected members 24, 26, 28 and 30 spanned by a floor structure 32. It may be covered by a lid 34 of transparent suitable sheet form material, such as glass or plastic. Whether or not the lid is provided, there is defined a holding means for a sun energy surface supported by the frame. For example, the floor structure may span the frame and be provided with a face which is black. Alternatively, the frame may support a reflective parabolic mirror surface or, as another alternative, a lens system. In any event, the main surface is arranged so that solar energy affects it and the device comprises means to convert the energy of the sun to heat energy or electrical energy.

In one embodiment shown a network of interconnected pipes 35, which are preferably black, are arranged in heat exchanging relation with the black floor face of the member 16 to transfer heat absorbed by the black main face of the member 16 to fluid which flows through the network. Thus the pipe network may be described as a collector means of the solar energy converted to heat.

The network of pipes supported by the frame structure has an inlet and an outlet 40 and 42 respectively to conduct flowable medium, such as water, to and through the network. The main surface of the member 16 is sun seeking, that is the main surface is presented perpendicular to the sun. This is accomplished by means of a sun tracking system which includes light sensing and driving means, which will be described more fully hereinafter. The member 16 is caused to move and follow the sun during daylight hours so that, so long as the sun shines, the sun responsive surface of the member 16 is kept substantially and effectively in perpendicular relation to the rays of the sun. Thus the energy of the sun which affects the member 16 is maximized; and, hence, the energy output of the device is increased.

The member 16 may be configured to concentrate or focus solar energy on the solar energy collector means of the pipe network, which may include a single pipe. To this end, the member 16 may be in the form of a lens means or a mirror means arranged to concentrate or focus the sun energy upon the collector means or network for high temperature heating by heat transfer to the material in the network. The collected solar energy may be used, alternatively, for photoelectric generation of energy, or a combination of the same.

With reference to the drawings, the mechanical structure of the illustrated preferred embodiment will now be described. The support means for the collector is seen to include the base 12 which is composed of a plurality of radially extending feet 43, 44, 45, and 46 of a common length which are interconnected at a central zone or hub 48. To the hub 48, means are provided to rotatably support the aforesaid yoke 14 for movement through at least about 180° of rotation about the vertical axis through the hub. In the illustrated preferred embodiment, this means comprises an upstanding sleeve 50 which is journaled at its lower end 52 to the hub. Stabilizing means, not shown, may be provided to radially outwardly extend the support zone of the hub at the base. The sleeve which extends through a vertical bore in the central yoke member 56 is keyed to the yoke and provided at its upper end zone 54 with a gear 58 for rotation of the yoke, sleeve and gear relative to the base hub. The gear 58, which has a central axial opening, is engaged with the drive gear 60 on the drive shaft 62 of a motor 64 which is fixed on the lateral member of the yoke. Thus, when the motor is energized, the yoke will be rotated through azimuth angles. Referring now to the means for tilting the member 16, means are provided on the upper end zones of the upstanding yoke members to tiltably connect the frame to the yoke. On the opposite sides 24 and 28 of the frame outwardly extending fixed coaxial pivot means are provided, each of which includes a sleeve 70, 70' connected as at 72, 72' to the frame members 28 and 24 respectively. On the distal end of the sleeve 70 there is fixed a gear 74 with a through axial passageway. This gear engages a drive gear 76 on the drive shaft 78 of a motor which is fixed to the upstanding end of the leg 20 of the yoke 14. Thus, when the motor 80 is energized, the frame will be tilted through elevation angles.

The collection means, that is the network for the flowable material will now be described. Generally speaking the network 35 in heat exchanging relation with the black floor face in the embodiment illustrated is composed of a plurality of equispaced pipes which are interconnected by lateral members and arranged to conduct water to be heated through the network in relatively equal flow volumes along the main network branches. The opposite ends of the network, that is the inlet and outlet 40 and 42, comprise pipes which extend through the sleeves 70 and 70' through the central opening in the gear 74 and through a universal fluid connection 95 downwardly through the pipes 90 and 92 to the central zone at the base of the yoke. The inlet pipe in the preferred embodiment shown extends in a pipe section 94 which may be housed, as shown in FIG. 2, within one of the feet of the base. Through an elbow connection, the flow continues upwardly through the sleeve 50 and through the opening in the gear 58 to the network and thence through a universal fluid connection 98. The outlet 100 connects through a flexible hose section, not shown, to a system to which the collected energy is to be delivered. In use, water or other medium is flowed through the network; and, by reason of being in heat exchanging relation with the main surface of the frame 16, it is heated.

The universal fluid connections, 95 and 98 are of the type which permit rotation of one side of the connection relative to the other side without interference of fluid flow therethrough. As shown in FIG. 8, one side terminates in an enlarged end recess 2 sized to receive a flanged end 3 of the other side which is held in the recess by means of an annular keeper member 4 fixed in sandwiching relation of the flange and the terminal end about the recess by screws 5 and which includes rotatable bearing means 6 so that relative rotation of the pipes 7 and 8 may take place.

The sensing system to orient the tiltable member 16 will now be described. In a preferred embodiment, it includes a sun, azimuth angle sensing means and a sun, elevation angle sensing means. Referring first to the azimuth angle sensing means, it includes a box 102 which is fixedly supported as at 104 to the yoke. The box includes opposite main sides 106 and 108 which are closely adjacent each other and which are closed at one end such as 110 and between the closely spaced opposite main sides. The top is open defining a slit opening, see 112 in FIG. 1. The interior of the box 102 is black and, adjacent the floor 106, a photoelectric cell 109 is centrally arranged. It is thus seen that, when the box is oriented such that the slit 102 faces the sun, ample light will reach the photoelectric cell to operate it; otherwise, the light will not reach it. The photoelectric cell is connected electrically to a normally closed switch means and upon light impinging upon the photoelectric cell, the switch means is adapted to be closed; and in this manner energy flow to the motor 64 to energize it is provided except when the slit 102 is not facing the sun. Referring now to the elevation angle sensing means, it includes a box 102' which is fixed on the collector as at 104'; and it includes a narrow elongate slit 136 with the interior of the box being black and including a photoelectric cell 138 adjacent the base to operate the photoelectric cell to close a normally closed switch when the slit is tilted so that the tilt motor will stop seeking the sun only when the longitudinal axis faces the sun.

The electrical system which interconnects the motor and sensing means will now be described. Reference is made to FIG. 4, which is a block diagram of the electrical system. Energy from a source 200 is conducted to a conventional speed control device 202 which are in two parallel motor branches generally designated by the numerals 204 and 206 and each of which includes motor control relays 208 and 210 in series with reversing relays 212 and 214, each of which include limit switches 216 and 218 and 220 and 222 respectively which are in series with the motors 64 and 80 respectively. Each of the motor circuits is connected through a master relay 219 to the sensing means which includes the elevation sensing relay 221 and the azimuth sensing relay 224 which each have in series the respective photoelectric cells 109 and 138. In a preferred embodiment a master photocell 225 which is not shielded is provided which is normally closed and which senses whenever there is not sufficient sunlight and shuts the system down by interrupting energizing current flow.

The operation of the above-described preferred embodiment will now be explained generally. Water or other selected medium is caused to flow through the network. When the sun is shining, and the system is energized by the source because the master relay is closed by the sunlight affecting the master photoelectric cell 225 the normally closed relay connected to the azimuth photoelectric cell will operate the azimuth motor to rotate the yoke to find the sun, i.e., so that the tiltable member will face the direction of the sun; and the normally closed relay connected to the photoelectric cell will operate the elevation motor so that the member 16 will tilt between the limit switches to the elevation angle and face the sun.

Referring to the embodiment of FIG. 7, the tilt member 216 may be provided with a parabolic mirrored surface 217 with the network comprising a pipe 219 in the focus zone so the material flowing through it is heated.

What is claimed is:

1. In combination, sun tracking means and a solar energy collector, said solar energy collector including sun energy collecting means to continuously conduct flowable material and including an inlet and an outlet for the material, and a main collector face arranged in sun energy transferring relation with the collecting means, said tracking means including means to selectively orient the face to receive sun rays and including drive means to orient the collector face, and means to support the combination;

said means to orient including sun-seeking sensing means to sense the azimuth angle and elevation angle of the sun and means operatively interconnecting said sensing means and drive means to orient, connector means including conduit to continuously travel flowable material through said inlet and outlet simultaneously with the operation of said tracking means.

2. The combination as set forth in claim 1 wherein said means to support includes an upwardly extending shaft and a support base, and said shaft includes an upper end zone and a lower end zone, means interconnecting the upper end zone and the collector for relative rotation of said collector with respect to said shaft through an azimuth angles and means securring the lower end zone to the base.

3. The combination as set forth in claim 2 wherein said means connecting said upper end zone to the collector comprises a structure including a generally laterally extending support member having opposite end zones and an upstanding leg on each of the opposite end zones of the support member, and tilt connection means on the legs tiltably interconnecting the collector to the legs for rotation of the collector face through a predetermined range of elevation angles.

4. The combination as set forth in claim 2 wherein said means to orient includes sun seeking sensing means to sense the azimuth angle and elevation angle of the sun and means operatively interconnecting said sensing means and drive means to orient.

5. The combination as set forth in claim 3 wherein said means to orient includes sun seeking sensing means to sense the azimuth angle and elevation angle of the sun and means operatively interconnecting said sensing means and drive means to orient.

6. The combination as set forth in claim 1 wherein said sensing means includes photoelectric cell means to be energized by the sun when facing the sun and including shield means to shield the sun rays from the cell means except when in perpendicular relation to the sun rays.

7. The combination as set forth in claim 4 wherein said sensing means includes photoelectric cell means to be energized by the sun when facing the sun and including shield means to shield the sun rays from the cell means except when in perpendicular relation to the sun rays.

8. The combination as set forth in claim 5 wherein said sensing means includes photoelectric cell means to be energized by the sun when facing the sun and including shield means to shield the sun rays from the cell means except when in perpendicular relation to the sun rays.

9. A sun tracking solar energy device comprising:

a yoke having a pair of spaced upstanding members and a lower lateral member connecting the upstanding members, a support base for the yoke, means rotatably connecting the yoke to the base for rotation of the yoke about a vertical axis through a first range of azimuth positions, a frame including a main face pivotally connected between the upright members for rotational movement about the pivotal connection through a second range of elevation positions, sun tracking means including drive means to move the frame through the ranges of position and including sensing means connected to the drive means to sense the location of the sun, and a pipe means with an inlet and an outlet, said pipe means being in a predetermined heat exchanging relation with the face and supported on the frame for simultaneous movement with the frame;

said pipe means including connector means and conduit means to continuously travel liquid through said inlet and outlet simultaneously with operation of said sun tracking means, said face comprising a black face and said pipe means comprises a network of interconnected black pipe in heat exchanging relation with said face to heat (water) liquid flowing through the pipe means.

10. The device as set forth in claim 9 wherein said face comprises a black face and said pipe means comprises a network of interconnected black pipe in heat exchanging relation with said face to heat water flowing through the pipe means.

11. The device as set forth in claim 9 wherein said face is of parabolic configuration and mirrored and said pipe means comprises a pipe through the focus of the parabolic surface to concentrate heat reflected from the face to the pipe.

* * * * *